July 15, 1924.  
F. N. SPRAGUE  
1,501,819  
AUTOMOBILE SPRING CONSTRUCTION  
Filed April 14, 1923   2 Sheets-Sheet 1
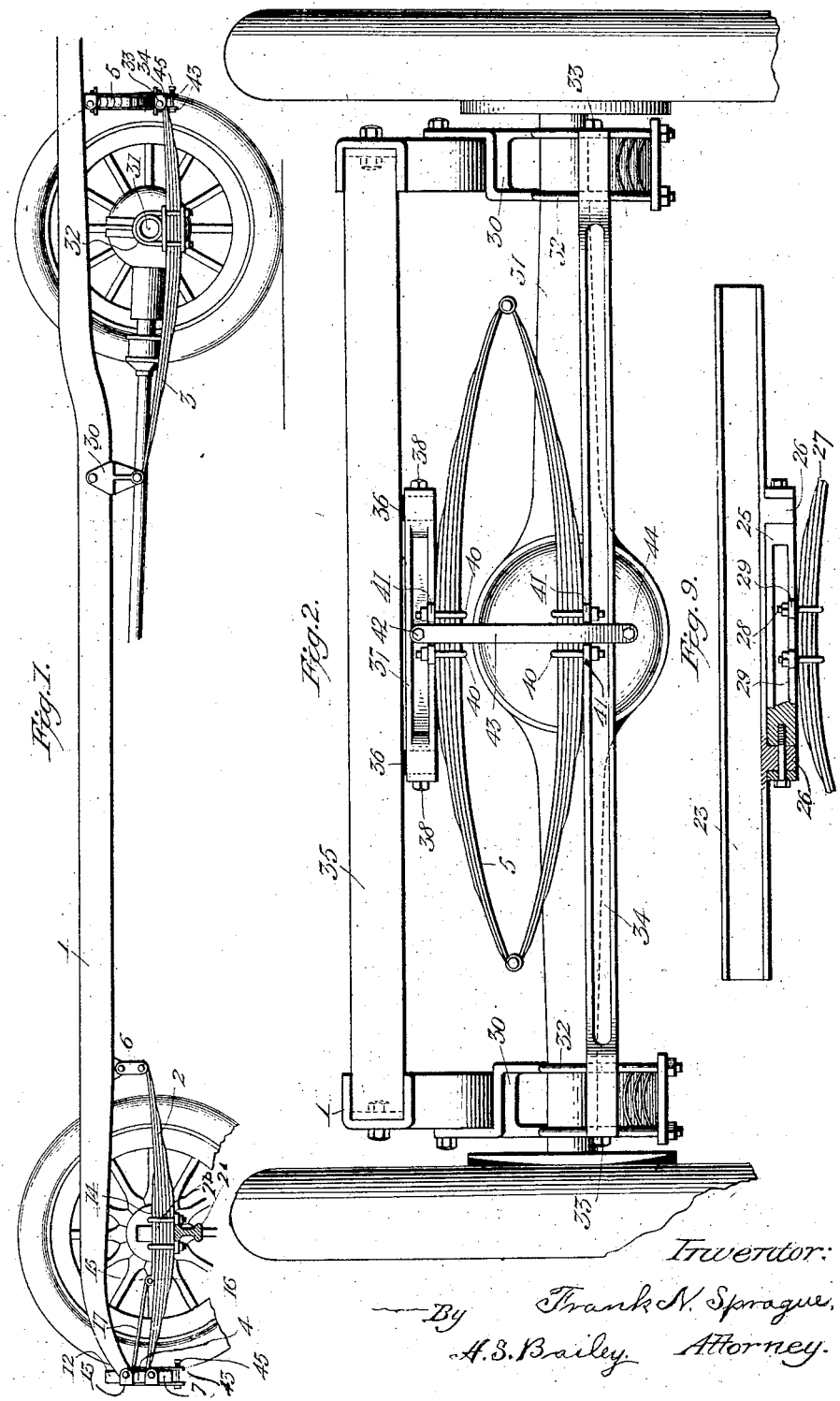
Inventor:
By Frank N. Sprague,
A. S. Bailey, Attorney.

July 15, 1924.
F. N. SPRAGUE
AUTOMOBILE SPRING CONSTRUCTION
Filed April 14, 1923    2 Sheets-Sheet 2
1,501,819
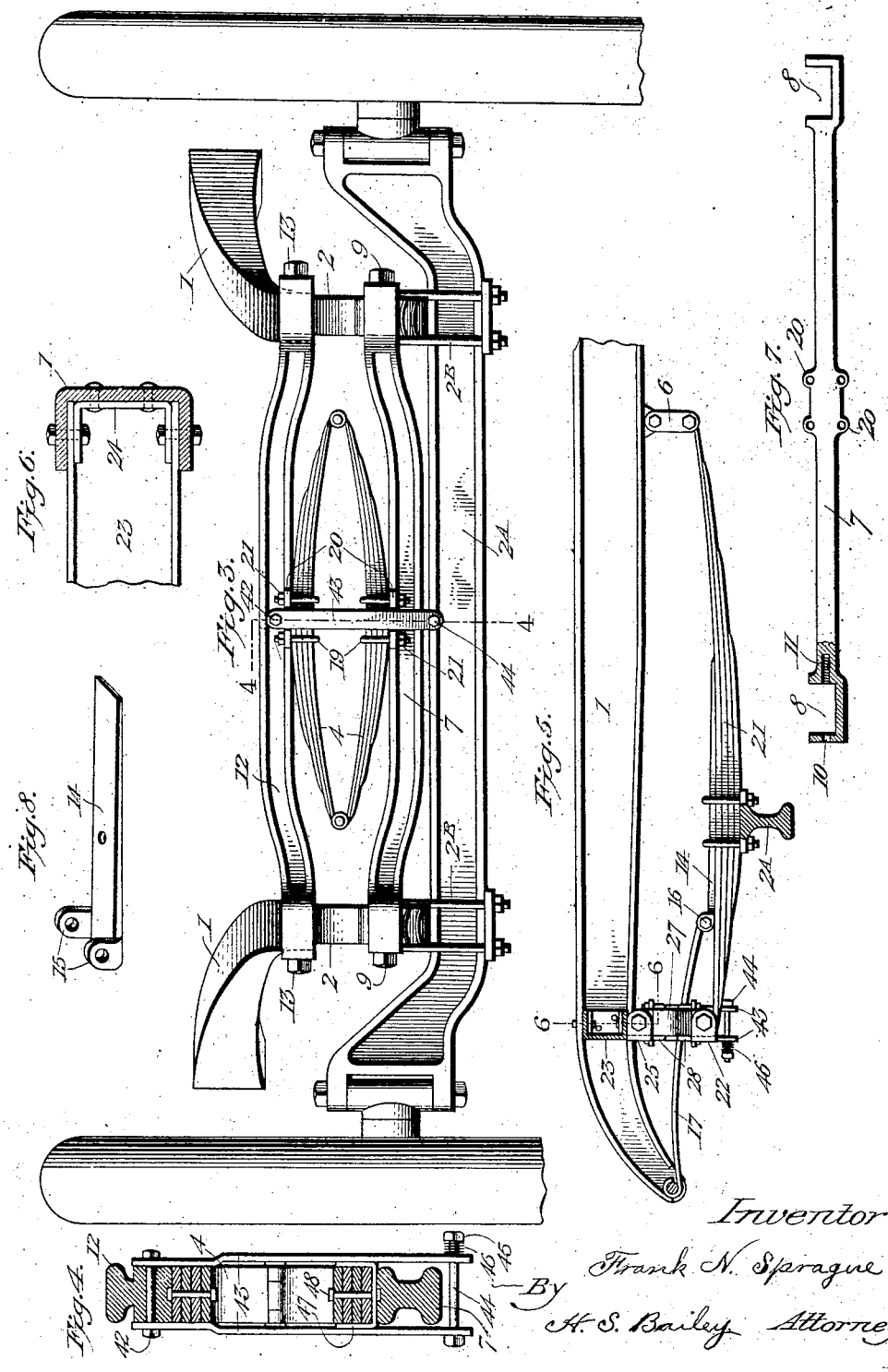
Inventor
Frank N. Sprague
By H. S. Bailey, Attorney Patented July 15, 1924.

1,501,819

UNITED STATES PATENT OFFICE.

FRANK N. SPRAGUE, OF HOLYOKE, COLORADO.

AUTOMOBILE-SPRING CONSTRUCTION.

Application filed April 14, 1923. Serial No. 632,024.

*To all whom it may concern:*

Be it known that I, FRANK N. SPRAGUE, a citizen of the United States of America, residing at Holyoke, county of Phillips, and State of Colorado, have invented a new and useful Automobile Spring Construction, of which the following is a specification.

My invention relates to improvements in automobile spring construction, and is designed as an improvement over an invention embodied in an application filed by me on the 6th day of February, 1923, Serial No. 617,353, for improvements in three point suspension spring construction for automobiles and like vehicles.

The object of the present invention is to provide a spring construction for automobiles, comprising coacting semi-elliptic side springs and a full elliptic end spring for each end of the frame, the springs of each set being so related that the resiliency of the elliptic springs is utilized by each side spring whereby the weight of the body is more equally distributed upon the wheels when uneven or side hill roads are encountered or in turning corners, thereby lessening the chance of skidding.

Further, to provide a spring construction of this character, which permits of lighter side springs, thereby giving greater flexibility in the spring action. A further object of the invention is to provide in this connection, auxiliary means for preventing the too sudden compression and rebound of the elliptic springs, whereby the drop and rebound of the car body is so retarded as to practically eliminate the discomforts otherwise occasioned by the common forms of spring construction.

These objects are accomplished by the mechanism illustrated in the accompanying drawings, in which:

Fig. 1 is a side elevation of an automobile chassis equipped with the improved spring construction;

Fig. 2 is an enlarged rear end view of Fig. 1;

Fig. 3 is an enlarged front view thereof;

Fig. 4 is a sectional view on the line 4—4 of Fig. 3;

Fig. 5 is a side view of the front end of the frame, showing a slight modification of the construction shown in Fig. 1;

Fig. 6 is an enlarged sectional view on the line 6—6 of Fig. 5;

Fig. 7 is a plan view of one of the cross bars shown in Fig. 3;

Fig. 8 is a perspective view of the specially constructed upper leaf of the front side springs; and Fig. 9 is a rear view of the cross bar and the bar connected thereto, as shown in Fig. 5.

Referring to the accompanying drawings:

The numeral 1 refers to the side bars of an automobile frame, 2 and 3 to the front and rear side springs, respectively, and 4 and 5 to the front and rear end springs respectively. The rear end of each front side spring 2 is connected to a shackle 6 which is pivotally connected to the side bar 1 and the front ends of these springs are connected to a cross bar 7 of a style shown in front view, Fig. 3, and in plan view, Fig. 7. The end portions of this bar are bent to lie on a higher horizontal plane than the major portion of the bar, and are recessed as shown at 8 to receive the ends of the springs, which are mounted on bolts 9 which are passed through unthreaded holes 10 in the extremities of the bar, and enter threaded holes 11 in the body portion of the bar. A similar shaped cross bar 12 connects the forward ends of the side bars 1, but the bar 12 is reversed with respect to the bar 7, so that its end portions lie on a lower horizontal plane than the remaining portion of the bar, and the recesses in its end are slightly wider than the recesses 8 in the bar 7 in order to receive the ends of the said side bars which are pivotally connected to the ends of the bar 12 by bolts 13. In the usual construction the front ends of the side springs are connected to the ends of the side bars and, therefore, the side bars exert a pulling action on the front ends of the springs, under the propelling action of the rear wheels. In the present instance, however, the front ends of these springs are connected to the cross bar 7 and in order to connect the spring with the front ends of the side bars, I employ a short upper leaf 14 for each front side spring, the forward ends of which are formed with ears 15, through which are pressed bolts 16 which also pass through the eyed ends of pulling arms 17, the forward ends of which are secured around the bolts 13 which connect the cross bar 12 with the side bars 1. The springs 2 are connected to the front axle 2ᴬ by U-bolts 2ᴮ in the usual manner.

An elliptic spring 4 is interposed between the cross bars 7 and 12 and is secured to the said bars by means of U-bolts 19 the end portions of which pass through apertured lugs 20 which are formed on the said bars, and receive nuts 21.

In the construction above described, the side springs may be much lighter than those commonly employed, as the elliptic spring supports substantially one-half the weight of the front end of the body and in this construction, also, the side springs are of the usual length. In Fig. 5, however, is shown a slightly different construction, and in this arrangement, side springs 21 are employed, which from their connection with the axle to their rear ends are of the usual length, but that part of the springs forward of the axle are approximately one-half the usual length, and their ends are connected to a cross bar 22, which is straight throughout its length, but in other respects is of the same construction as the bar 7. The side bars 1 are connected by a cross bar 23, which is preferably of channel form and is in vertical line with the cross bar 22, the ends of the bar being secured to the side bars by bolts or rivets which pass through the horizontal members of the bars and through U-plates 24, which are riveted to the side bars, one end portion of said cross bar 23 and the manner of its connection with the side bar, being shown in Fig. 6.

To the under side of the cross bar 23 is secured a short cross bar 25, which is constructed in a similar manner to the cross bar 7, its end portions being bolted to depending lugs 26 on the said cross bar 23, which fit into the recessed ends of the bar 25. Between the bars 22 and 25 is interposed an elliptic spring 27, the halves of which are secured to the said bars by U-bolts 28, which pass through apertured lugs 29 on the said bars in the same manner as described in connection with the spring 4. The top leaf 14 having the apertured ears 15, is also employed in this arrangement, and these leaves are connected by pulling leaves 17 with the forward ends of the side bars, in the same manner as described in connection with spring 2. The springs 21 may be much lighter than the common style of side springs, and as the portion of the spring forward of the axle is only about half the length of the forward portions of the usual springs, this shortened portion will be much stiffer than if it were of the usual length, but when acting in connection with the elliptic spring 27, the necessary resiliency is obtained, each of said side springs utilizing the resiliency of the elliptic spring, which in this construction, supports approximately two-thirds of the weight of the body.

The constructions shown in Figures 1, 3 and 5 also prevent swinging of the front end of the car body.

Each rear side spring 3 is connected at its forward end to a bracket 30 which is rigidly bolted to the side bar, and in the present construction these springs, also, may be much lighter than the usually employed springs. The springs 3 are connected to the rear axle 31 by U-bolts 32 in the usual manner, and the portions of these springs rearward of the axle 31, are about half the usual length, and are therefore correspondingly stiffer. The rear ends of these springs are connected by pivot bolts 33, with the end portions of a cross bar 34 which is straight throughout its length, but is in other respects similar to the cross bars 7 and 12. The side bars 1 are connected by a cross bar 35, at a short distance from their ends, and this bar is provided with depending apertured lugs 36, to which the opposite recessed ends of a short cross bar 37, are pivotally attached by bolts 38, the cross bar 37 being straight throughout its length but in other respects similar to the cross bars 7 and 12, previously described. Between the cross bars 34 and 37 is interposed an elliptic spring 5, which is connected to the said bars by U-bolts 40, the members of which pass through apertured lugs 41, on the respective bars and are secured by nuts in the usual manner.

In this arrangement, as in the front end arrangement above described, the resiliency of the elliptic spring is utilized by each of the side springs, and as the elliptic springs are located midway between the front and rear wheels, respectively, a shock resulting from obstructions encountered by both front or rear wheels, is received by the side springs, and transferred to the elliptic springs which further cushion the shock, the diminished force of which is passed on to the side bars, at a point midway between their ends, when the load is equalized. When either of the front or rear wheels encounters an obstruction independently of the other front or rear wheel, the shock is first received by the side spring and then transmitted to the elliptic spring, which further cushions the shock and delivers its spent force at a point midway between the side bars, thus practically eliminating the side bump or jolt which would have been imparted to that side of the car whose wheel encountered the obstruction if the rear end of the rear side spring or the front end of the front side spring had been attached to the end of the side bar, as in spring construction in present use.

In connection with the front and rear elliptic springs, I employ a shock absorbing or minimizing device, and as these devices are identical, I will describe only the one used in connection with the front spring 4.

A bolt 42 passes centrally through the cross bar 12 and secures to the opposite sides of said bar the upper ends of a pair of vertical flat arms or blades 43, which extend down below the other cross bar 7. A bolt 44 is passed through the lower ends of these blades, a nut 45 is screwed on the end of this bolt and a short coil spring 46 surrounds the bolt and is interposed between the nut and the adjacent blade. The U-shaped wear plate 47 is placed between the lower half of the spring 4 and the upper side of the bar 7 and is held in place by a bolt 48 which passes through the spring leaves and through the base portion of the said wear plate, and the side members of the wear plate extend up to the upper leaf of this half of the spring and the blades 43 are caused to bear against the side members with a resilient pressure, by turning the nut 45 against the spring 46. It will thus be seen that the blades 43 can be clamped against the sides of the wear plate under any desired pressure, and that as the blades are moved up and down by the compression and rebound of the spring 4, the frictional resistance offered by the engaging faces of the said blades and wear plate, will so retard the movement of the said blades that sudden or violent drop or throw of the car body will be prevented.

The improved spring arrangement gives greater resiliency of spring action under all road conditions and also practically eliminates the side jolts which are inevitable when both ends of the side springs are connected to the side bars.

Having described my invention, what I claim as new and desire to secure by Letters Patent, is:

1. In automobile spring construction of the character described, the combination with the body supporting side bars and axle, of a cross bar connecting said side bars, semi-elliptic side springs secured to said axle so that the greater part of their lengths lie on one side of said axle, the ends of the longer portion of said springs being secured to said side bars, a cross bar connecting the opposite ends of said springs, a cross bar connecting said side bars, an elliptic spring interposed between said cross bars, pulling members secured to said side springs and connected to the ends of said side bars, friction elements secured at one end to opposite sides of one of said cross bars and extending beyond the opposite cross bar, and means for resiliently pressing the unsecured end portions of said friction elements against said elliptic spring, thereby to retard the compression and rebound of said spring.

2. In automobile spring construction of the character described, the combination with the body-supporting side bars, the axle and half elliptic side springs secured intermediate of their ends to said axle, and at one end to said side bars; of a cross bar connecting the other ends of said springs, a cross bar connecting said side bars, an elliptic spring interposed between said cross bars, parallel blades secured to opposite sides of the upper cross bar and extending below the lower cross bar, wear plates on opposite sides of the lower half of said elliptic spring, and means for clamping said blades against said wear plates with a resilient pressure, thereby to retard the compression and rebound of said elliptic spring.

3. In automobile spring construction of the character described, the combination with body supporting side bars, the axle, and half elliptic side springs secured intermediate of their ends to said axle and at one end to said side bars, a cross bar connecting the other ends of said springs, a cross bar connecting said side bars and an elliptic spring interposed between said cross bars; of blades secured at their upper ends to the opposite sides of the upper cross bar and extending below the lower cross bar, wear plates interposed between said blades and the lower half of said elliptic spring and secured thereto, a bolt extending through the lower ends of said blades, a nut on said bolt, and a coil spring on said bolt interposed between said nut and the adjacent blade, whereby said blades are clamped against said wear plates with a resilient pressure, thereby to retard the compression and rebound of said spring.

4. In automobile spring construction of the character described, the combination with the body supporting side bars, the axle, and half elliptic side springs secured to said axle so that substantially a third of their lengths lie on one side of the axle, the ends of their longer portions being secured to the side bars; of a cross bar connecting their other ends, a cross bar connecting the side bars, a cross bar connected to the latter bar, an elliptic spring interposed between the last mentioned cross bar and the bar connecting the ends of the side springs, upper leaves in said side springs having apertured ears and bolts extending therethrough, pulling members connected at one end to said bolts and at their opposite ends to the adjacent ends of said side bars, and friction means related to said elliptic spring and adapted to retard the compression and rebound of the same.

5. In automobile spring construction of the character described, the combination with the body supporting side bars, the axle, and side springs connected at one end to said side bars and intermediate of their ends to said axle, a cross bar connecting the ends of the side bars and an elliptic spring interposed between said cross bars; of blades connected at their upper ends to opposite sides of the upper cross bar and centrally of the length of said bar and extending below the lower cross bar, a U-shaped wear plate extending around the blades of the lower half of said elliptic spring and secured thereto, a bolt extending through the lower ends of said blades, a nut thereon, and a coil spring interposed between the nut and the adjacent blades, whereby the said blades are clamped against the members of the said wear plate with a resilient pressure, and members connected at one end to the adjacent ends of said side bars and at their opposite end to said side springs at a point between the axle and the ends of the springs which are connected to the cross bar.

In testimony whereof I affix my signature in presence of two witnesses.

FRANK N. SPRAGUE.

Witnesses:
T. G. FIEDLER,
C. E. PAUL.